(12) United States Patent
Labuda et al.

(10) Patent No.: US 9,307,093 B2
(45) Date of Patent: *Apr. 5, 2016

(54) DETERMINING COMMUNICATIONS CHARGING

(71) Applicant: Matrixx Software, Inc., Mountain View, CA (US)

(72) Inventors: David Labuda, Hillsborough, CA (US); Norin Saxe, Los Gatos, CA (US)

(73) Assignee: Matrixx Software, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/657,080

(22) Filed: Mar. 13, 2015

(65) Prior Publication Data

US 2015/0189094 A1     Jul. 2, 2015

Related U.S. Application Data

(63) Continuation of application No. 14/020,094, filed on Sep. 6, 2013, now Pat. No. 9,008,289, which is a continuation of application No. 13/206,421, filed on Aug. 9, 2011, now Pat. No. 8,553,862.

(60) Provisional application No. 61/372,157, filed on Aug. 10, 2010.

(51) Int. Cl.
*H04M 15/00* (2006.01)
*H04L 12/14* (2006.01)
*H04W 4/24* (2009.01)

(52) U.S. Cl.
CPC ........... *H04M 15/31* (2013.01); *H04L 12/1432* (2013.01); *H04M 15/43* (2013.01); *H04M 15/66* (2013.01); *H04M 15/785* (2013.01); *H04M 15/80* (2013.01); *H04M 15/8022* (2013.01); *H04M 15/81* (2013.01); *H04M 15/8214* (2013.01); *H04M 15/8271* (2013.01); *H04M 15/835* (2013.01); *H04M 15/8351* (2013.01); *H04M 15/8355* (2013.01); *H04M 15/84* (2013.01); *H04M 15/85* (2013.01); *H04M 15/851* (2013.01); *H04M 15/853* (2013.01); *H04M 15/854* (2013.01); *H04M 15/858* (2013.01); *H04W 4/24* (2013.01)

(58) Field of Classification Search
CPC ..... H04M 15/00; H04M 17/10; H04M 15/43; H04M 15/44; H04M 15/58; H04M 15/61; H04M 15/80; H04M 15/41; H04M 15/66
USPC ............ 379/114.03, 114.05, 114.06, 114.28, 379/121.02; 455/405–406
See application file for complete search history.

(56) References Cited

U.S. PATENT DOCUMENTS

| | | | |
|---|---|---|---|
| 7,486,945 B2 | 2/2009 | Senn et al. | |
| 7,590,228 B2 * | 9/2009 | Lu et al. | 379/114.01 |
| 8,553,862 B2 * | 10/2013 | Labuda et al. | 379/114.03 |
| 9,008,289 B2 * | 4/2015 | Labuda et al. | 379/114.03 |

* cited by examiner

*Primary Examiner* — Quoc D Tran
(74) *Attorney, Agent, or Firm* — Van Pelt, Yi & James LLP

(57) ABSTRACT

A system for determining a communication charge comprising a charging equation determiner, an inflection point determiner, and a charge determiner. The charging equation determiner for determining a charging equation based at least in part on a normalized set of inputs. The inflection point determiner for determining an inflection point based at least in part on a charging structure database. The charge determiner for determining a communication charge based at least in part on the charging equation and the inflection point.

19 Claims, 12 Drawing Sheets

| Balances: | US Dollars | | | | | | | | | |
|---|---|---|---|---|---|---|---|---|---|---|
| | Peak Minutes Used (new bucket each month) | | | | | | | | | |
| | Off-Peak Minutes Used (new bucket each month) | | | | | | | | | |
| | | | | | | | | | | |
| Example: | Phone call begins at 4:40pm and lasts for 45 minutes | | | | | | | | | |
| | At start of call, dollars balance = | | | | | | | 85 | | |
| | At start of call, Peak Minutes Used for current month | | | | | | | 90 | | |
| | At start of call, Off-Peak Minutes Used for current month | | | | | | | 80 | | |
| | | | | | | | | | | |
| Time | 4:40 | 4:45 | 4:50 | 4:55 | 5:00 | 5:05 | 5:10 | 5:15 | 5:20 | 5:25 |
| Rate | $0.00 | $0.50 | $0.50 | $0.20 | $0.20 | $0.35 | $0.35 | $0.35 | $0.35 | $0.10 |
| Discount | 0% | -20% | -20% | -20% | -20% | -40% | -40% | -40% | -40% | -40% |
| Charge | $0.00 | $2.50 | $5.00 | $6.00 | $7.00 | $8.75 | $10.50 | $12.25 | $14.00 | $14.50 |
| Discount | $0.00 | -$0.50 | -$1.00 | -$1.20 | -$1.40 | -$2.10 | -$2.80 | -$3.50 | -$4.20 | -$4.40 |
| Net Cost | $0.00 | $2.00 | $4.00 | $4.80 | $5.60 | $6.65 | $7.70 | $8.75 | $9.80 | $10.10 |
| Peak Min | 90 | 95 | 100 | 105 | 110 | 110 | 110 | 110 | 110 | 110 |
| Off-Peak Min | 80 | 80 | 80 | 80 | 80 | 85 | 90 | 95 | 100 | 105 |
| Dollars | 85 | $87.00 | $89.00 | $89.80 | $90.60 | $91.65 | $92.70 | $93.75 | $94.80 | $95.10 |

FIG. 10

DETERMINING COMMUNICATIONS CHARGING

CROSS REFERENCE TO OTHER APPLICATIONS

This application is a continuation of co-pending U.S. patent application Ser. No. 14/020,094, entitled DETERMINING COMMUNICATIONS CHARGING filed Sep. 6, 2013 which is incorporated herein by reference for all purposes, which is a continuation of U.S. patent application Ser. No. 13/206,421, now U.S. Pat. No. 8,553,862, entitled DETERMINING COMMUNICATIONS CHARGING filed Aug. 9, 2011 which is incorporated herein by reference for all purposes, which claims priority to U.S. Provisional Application No. 61/372,157, entitled DETERMINING CALL CHARGING filed Aug. 10, 2010 which is incorporated herein by reference for all purposes.

BACKGROUND OF THE INVENTION

Determining a charge or cost for communications (e.g., a call or data traffic) is complex and time consuming. Often the charge depends on multiple factors including communication time, communication date, communication rate plan, balance levels, the parties being communicated with, etc. Typically, the multiple input factors are all evaluated serially to determine the charging rate. Also, the rates do not necessarily remain the same during the communication (e.g., a call or data transfer) meaning that they need to be determined again as the factors influencing the charging rate change (e.g., call straddles a daytime/nighttime boundary, a balance level—for example, a total number of minutes or bytes). Since the determination of a charge or potential charge is typically performed several times for each communication (e.g., for initial authorization, at times during the communication, and at the end of the communication for determining the communication cost), charge determination represents a significant computational burden for a communication service provider and can be a rate limiting step for its ability to handle communication volume.

BRIEF DESCRIPTION OF THE DRAWINGS

Various embodiments of the invention are disclosed in the following detailed description and the accompanying drawings.

FIG. 10 is a table illustrating an embodiment of a charge determination.

DETAILED DESCRIPTION

Figure 1:
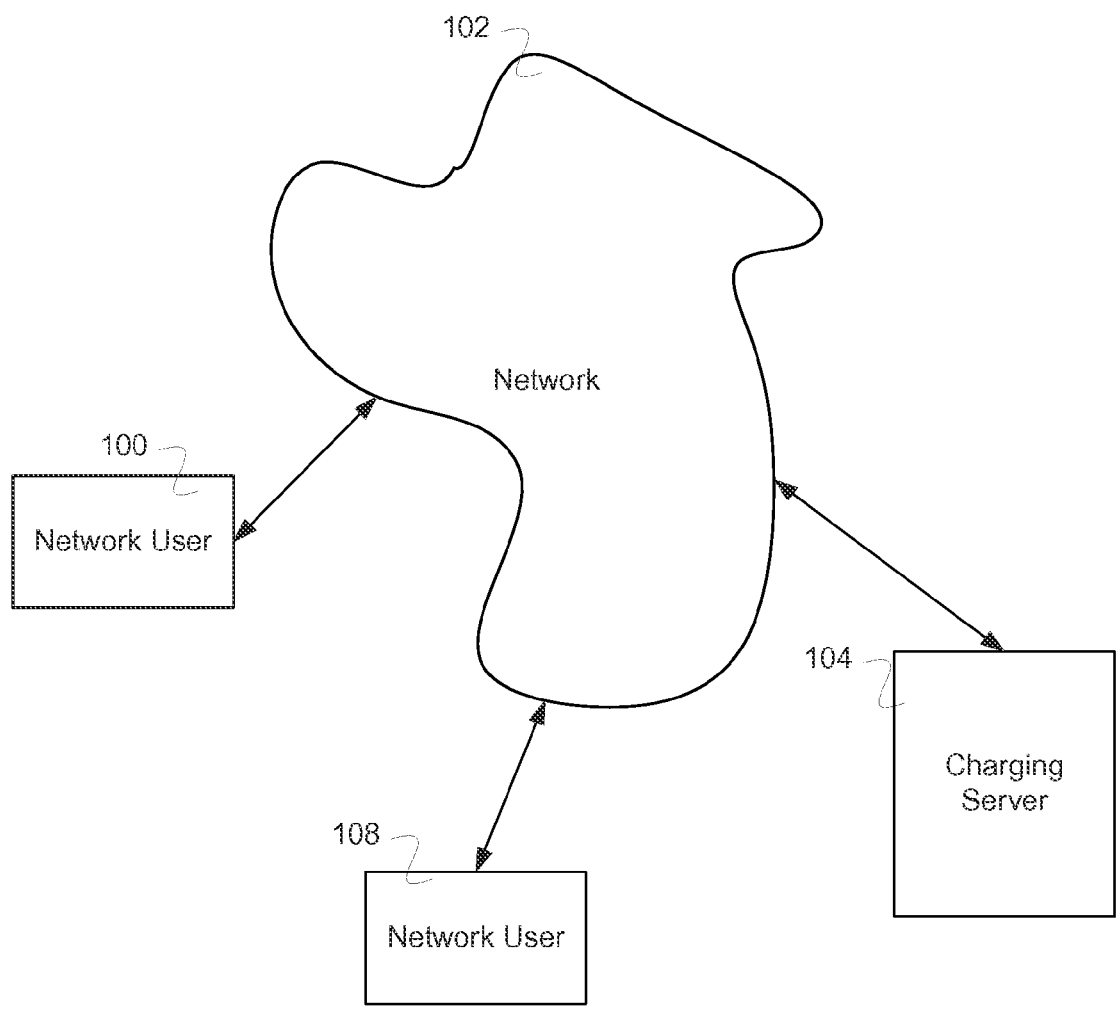
FIG. 1 is a block diagram illustrating an embodiment of a network system including optimized operations for a charging system architecture.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for determining a communication charge comprising a charging equation determiner, an inflection point determiner, and a charge determiner. The charging equation determiner for determining a charging equation based at least in part on a normalized set of inputs. The inflection point determiner for determining an inflection point based at least in part on a charging structure database. The charge determiner for determining a communication charge based at least in part on the charging equation and the inflection point.

In some embodiments, the system for determining a communication charge comprises a processor and a memory. The processor is configured to: 1) determining a charging equation based at least in part on a normalized set of inputs, 2) determining an inflection point based at least in part on a charging structure database, and 3) determining a communication charge based at least in part on the charging equation and the inflection point. The memory is coupled to the processor and configured to provide the processor with instructions.

The charging system handles authorization (e.g., can I call? how long can I call? How much data can I transfer? etc.), reauthorization (e.g., can I keep talking or downloading? Is there a policy limit to calls or data transfers? etc.), and final accounting of a connection between users over a network.

The charging system provides a quantity approved (e.g., minutes, text messages, bytes, etc.); and/or a balance impact (e.g., a charge towards an account balance, in some cases used to reserve the charge amount out of the balance available to a user); and/or a price impact (e.g., the amount of minutes or dollars that an account balance is to be changed). In some embodiments, a request of determining a charge is received after the communication and for these communication charges there is no authorization or reauthorization. During the processes of authorization and reauthorization of each user connecting to the network and communicating, the charging system receives a set of inputs, including system status inputs, user data inputs, and any other appropriate inputs. The inputs are used by the charging system to determine the current charging state of the user and the connection along one or more parameters (e.g., daytime/nighttime rate, rate plan type, promotional discount in effect, free minutes, plan minutes, rollover minutes, byte costs, base byte rate, run on byte rate, etc.). The set of parameters are known as normalized inputs, and each can take on one of a predetermined number of values (e.g., a day time rate and a night time rate; a peak rate, an off peak rate, a lunch time rate, and a weekend rate; etc.). After the set of normalized inputs has been determined, it is used to look up an entry in a multidimensional matrix, where the number of dimensions in the matrix is the same as the number of normalized inputs. The entry in the matrix contains a charging equation, used to determine how the user's account balance or balances change during the connection. In some embodiments, the charging equation is determined by building a compound charging equation from a number of simpler charging equations (e.g., a linear superposition of equations).

After a charging equation has been determined, it is applied to a test balance or balances to determine for how long it is valid (e.g., a time/condition when a boundary arises to the validity of the equation is no longer valid). As time passes or as other parameter values/balances are affected, account balances and other inputs to the charging system can change (e.g., minute balance remaining, dollar balance remaining, byte balances, etc.). Eventually, the change in the system inputs will cause a change in the normalized inputs (called an inflection point). For each of the normalized inputs, the duration or condition until a change occurs can be determined. The system determines the minimum time or the boundary condition until any of the set of normalized inputs changes; this is the duration or the boundary condition for which the charging equation is valid. The system must perform a reauthorization process when the charging equation(s) become(s) invalid in order to determine the new charging equation. In some embodiments, multiple charging equation segments are known (e.g., where a segment comprises a section between inflection points when a charging equation(s) is valid)—for example, in the event that the a charging rate is known, the time for charging rate change is known, and the charging rate that becomes valid after the change is known, then the charging rate can be fully predicted across the boundary without a reauthorization. For example, in the case where the rate plan charges $0.20/minute during peak hours and $0.10/minute during off-peak hours, a request to authorize a 20 minute call that begins 10 minutes before the switch from peak hours to off-peak hours can be fully authorized because both charging equations and the inflection point between them can be calculated in advance. In various embodiments, the boundary condition is not easy to predict because the inflection point depends upon an unknown variable, the inflection point is a moment in time but the charging equation is not time-based, or any other appropriate factor making the charging inflection point difficult to predict.

A communication system (e.g., a cellular telephone communication system or a cellular data communication system) comprises a large number of users and one or more server systems, all connected to a network. The users communicate with each other and the server system(s) via the network. The server system(s) manage connection and disconnection of the users to the network, and track accounting of the users' activities. When a user makes a connection to the network, a server authorizes the user's accounting on the network, verifying that the user is allowed to connect. Periodically during the connection, a server reauthorizes the user on the network, verifying that the user is allowed to stay connected. When a user disconnects from the network or completes a specific communication over the network, a server calculates the final accounting for the connection. Charging rates can depend on many things, including time of day, day of the week, location of the user, the user's rate plan, who the user is connecting to, any special or promotional connection rates in effect for the connection, and many other factors. Each conditional factor complicates the processes of authorization, reauthorization, and final accounting. When a large number of users are making connections to the network, a server may have many pending authorization requests, increasing each user's time to successfully make its connection as the server works through its queue. Minimizing time to complete the processes of authorization, reauthorization, and final accounting is thus crucial to maintaining a high performance network. The charging system disclosed provides a rapid and efficient manner of determining a call charge. Linear equation(s) for the charging rate is/are determined and can be collapsed to a single charging equation. Boundaries with respect to changing input variables (e.g., time, dollars, bytes, etc.) are determined so that it is known when the single charging equation is applicable and when the equation needs to be redetermined. In some embodiments, the input variables are all normalized to become indices for identifying the one or more linear equations used to determine the single charging equation by looking the linear equations up in a large lookup table/matrix/database using the indices.

In various embodiments, the process is abbreviated—for example, authorization and/or reauthorization are not performed, or any other appropriate combination of tasks for the process. In some embodiments, the transaction has already occurred and a charge is determined after the use of the service has been finished (e.g., a call is over, a number of bytes transferred, etc.).

In addition, other policy management decision-making processes outside of the area of charging systems can use a determiner similar to the equation determiner. Any kind of input can be used for the policy management decision-making system, as long as an input normalizer can be built for creating a normalized input that reflects the information in the input as it relates to the decision-making process. Once a set of inputs has been converted into a set of normalized inputs, the set of normalized inputs is used to locate an entry in a matrix of relevant policy management decisions. The located decision is output by the system as the response to the inputs.

In some embodiments, the normalizer has dynamic input, which requires that inflection points be updated to adjust for the dynamic inputs. For example, in the case of a rate plan that offers discounts as more data is downloaded (e.g. 10% discount once 10 Mb has been downloaded, 20% discount once 50 Mb has been downloaded), a balance must be maintained that dynamically tracks the amount of data downloaded.

While a download is still occurring, this balance may cross a defined threshold (10 Mb or 50 Mb in this example) and the normalized input derived from the balance will dynamically change, causing an inflection point and a redetermination of the charging equation(s).

FIG. 1 is a block diagram illustrating an embodiment of a network system including optimized operations for a charging system architecture. In the example shown, the network system includes network users 100 and 108. In various embodiments, the network system includes 3, 5, 26, 100, 10, 250, or any other appropriate number of network users. The network users communicate with network 102 via a communications device. In various embodiments, the communications device is a cellular communications device, a radio frequency communications device, a wired communications device, an optical communications device, or any other appropriate kind of communications device. Network 102 comprises one or more of the following: a cellular network, a local area network, a wide area network, a wired network, a wireless network, the Internet, a fiber network, or any other appropriate network enabling communication. Charging server 104 additionally communicates with network 102. Charging server 104 tracks communications between multiple network users (e.g., network users 100 and 108) for the purpose of charging them for their usage. In some embodiments, charging server 104 additionally verifies that a network user is allowed to use the network and authorizes them to make a connection. In some embodiments, charging server 104 additionally verifies that a network user is allowed to continue using the network and reauthorizes them to continue their connection. The functionality of charging server 104 is programmed into charging software, which is stored on and executed by charging server 104. Charging software implements optimized operations for a charging system architecture.

Figure 2:
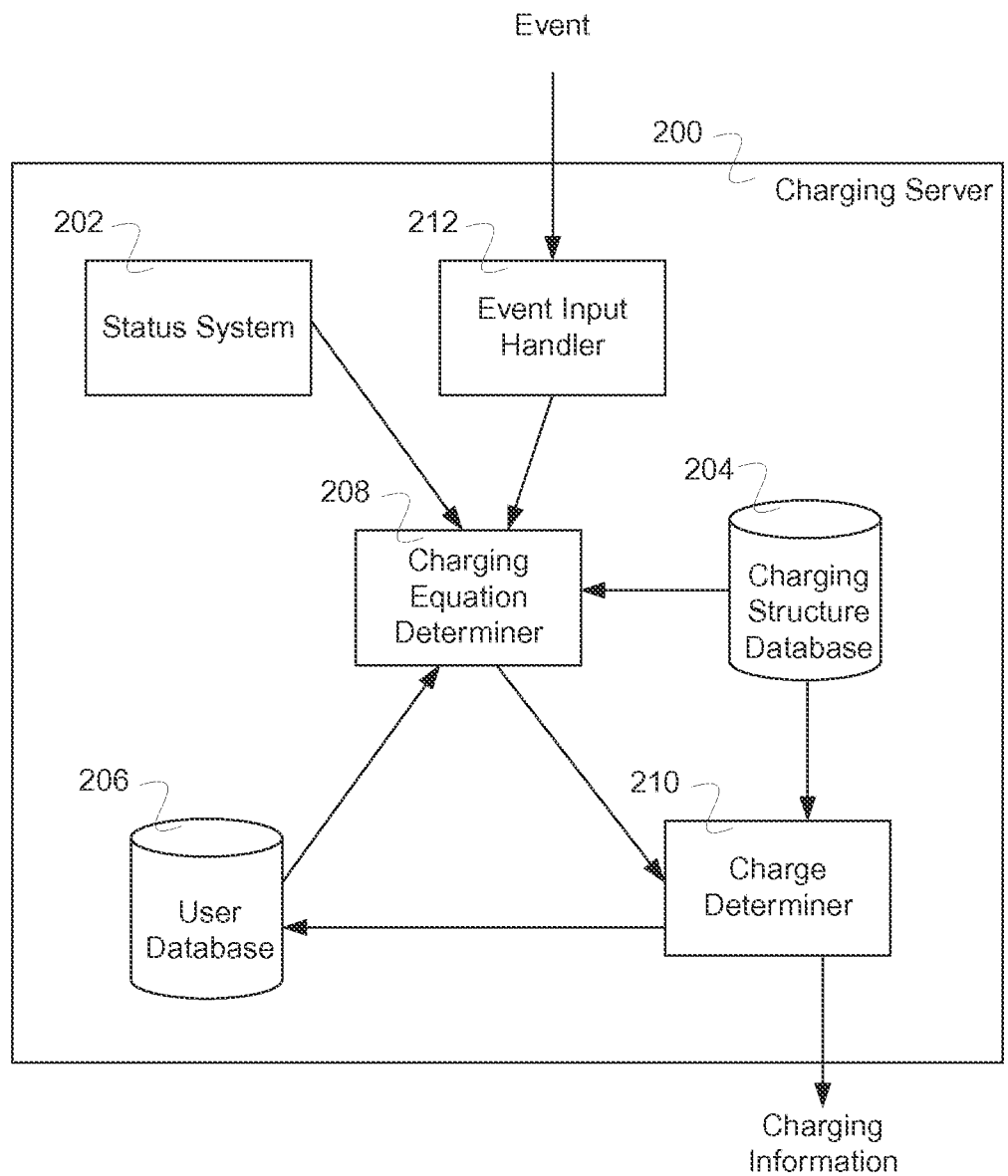
FIG. 2 is a block diagram illustrating an embodiment of a charging server.

FIG. 2 is a block diagram illustrating an embodiment of a charging server. In some embodiments, charging server 200 is used to implement charging server 104 of FIG. 1. In the example shown, status system 202, charging structure database 204, event input handler 212, and user database 206 provide input data to charging equation determiner 208. Event input handler 212 receives a request to determine whether a communication should be authorized, reauthorized, or to determine a cost for the communication. Event information is provided to event input handler 212—for example, type of request, user identifier, call identifier, quantity requested, etc. Received event information is used to identify charging structure data, status information, and/or user data needed for authorizing, reauthorizing, or pricing a call, or any other appropriate action performed by the charging server. In some embodiments, charging server 200 additionally comprises any other appropriate inputs to charging equation determiner 208. In various embodiments, status system 202 provides date and time, system load, promotional rate, or any other appropriate system status messages. In various embodiments, charging structure database 204 provides user rate plan structures, group rate plan structures, promotional offers, or any other appropriate charging structure data. For example, charging structure data includes charging rates during peak times, during off peak times, during holiday times, during day times, during night times, during weekend times, for long distance calls and international calls, for calls to friends, for calls to mobile callers inside a network, for calls to family members, for calls on a birthday, for communications within a zone, for calls to fellow employees, byte rates, etc. In various embodiments, user database 206 provides a user's name, account number, SIM code, rate plan, plan group name, account balances, associated group account balances, remaining connection time, associated group remaining connection time, policy parameters, device capabilities, friends and family lists, special days such as birthday, timezone and location information, or any other appropriate user data. Charging structure database 204 provides inflection point information. Inflection points define the end points for segments in which a charging equation is valid. For example, for a call made starting at a time, charging structure database 204 stores information regarding the rate for the time of the call start and the time for when the rate changes. The rate change time determines an inflection point. In various embodiments, the inflection point is defined by a rate change, is defined by a rate change time, is defined by a balance value (e.g., a time, a number of minutes, a data volume, a number of bytes, etc.), is defined by a balance range, or any other appropriate definition for an inflection point. In some embodiments, user database 206 provides information to charging server 200 via a network (e.g., network 102 of FIG. 1). In some embodiments, the inputs to charging equation determiner 208 are designated as either static or dynamic. Inputs to charging equation determiner 208 marked as static are those that will never change over the course of a connection (e.g., user's name, IP address of user or server, etc.). Inputs to charging equation determiner 208 marked as dynamic are those that can change over the course of a connection (e.g., current time, user's account balance, etc.). In some embodiments, inputs to charging equation determiner 208 marked as static are not received by charging equation determiner 208 during a reauthorization process.

Charging equation determiner 208 processes the inputs provided by status system 202, charging structure database 204, event input handler 212, and user database 206, and outputs a charging equation to charge determiner 210. The charging equation comprises a rate (e.g., a slope) and a fixed amount used to determine impact to a balance (e.g., U.S. dollars, time in minutes, bytes sent/received, number of text messages, etc.). The charge equation is linear algebra, so it takes the form "y=a+bx" where x is the quantity being rated, "a" and "b" are constants. The "a" is referred to as the "fixed amount" and is applied immediately and independent of the value of x, while "b" is the variable amount and is applied as a slope over x. This lets you create rate plans such as "10 cents to place a call, plus 5 cents/minute", where 10 cents would be the fixed amount and the 5 cents/minute would be the variable amount.

In some embodiments, charging structure database 204 is provided only to charging equation determiner 208 during system initialization, and is stored from then on. Charging equation determiner 208 implements optimized operations for a charging system architecture. In some embodiments, charging equation determiner 208 operates as part of a network user's (e.g., network user 100 of FIG. 1) authorization or reauthorization process. Charge determiner 210 receives a charging equation and modifies data stored in user database 206 according to the charging equation. In various embodiments, charging equation determines a charge based on a time passing or a number of bytes transferred or any other appropriate quantity change. In various embodiments, there are two approaches to managing the account balances while a session is active—"timer based" and "reservation based". Traditional SS7 networks use timers, data oriented systems use reservations because there is no deterministic link between time and the amount of data consumed. In some embodiments, in a timer-based solution, the balances are updated as time passes. This requires the session to be rated based on duration, so the passage of time determines the cost. In a reservation-based solution, this assumption is not made, so these systems apply both when time is the rated quantity and when it is not. In this model, the charging server updates a user's balances (either as reservations or actual charges) every time it receives notification from the network. For an authorization, the total cost of however much usage was authorized to the network is reserved, since the network will not come back until that is used up so it is necessary to ensure the ability to pay for that usage is maintained. For a reauthorization, the system can either add the cost of the newly authorized amount to the balance reservations, or it can charge for the amount that's actually been used so far, thereby dropping the original reservation and replacing with a charge, then do a reservation for the cost of the newly authorized usage. At session close (final charge calculation), all reservations are dropped and any uncharged usage is charged for. In some embodiments, the balances are not updated just by the passage of time, they are updated at these interaction points. In some embodiments, balances are not updated with reservations, and are only updated with final charges.

In various embodiments, charging server 200 comprises one or more processors, one or more memory units (e.g., solid state memory, integrated circuit memory, magnetic hard drive memory, redundant array of discs memory, etc.), field programmable gate arrays, custom processor integrated circuits, software modules running on general purpose processors or specialized processors (e.g., math co-processors), hardware, or any other appropriate combination of hardware or software.

Figure 3:
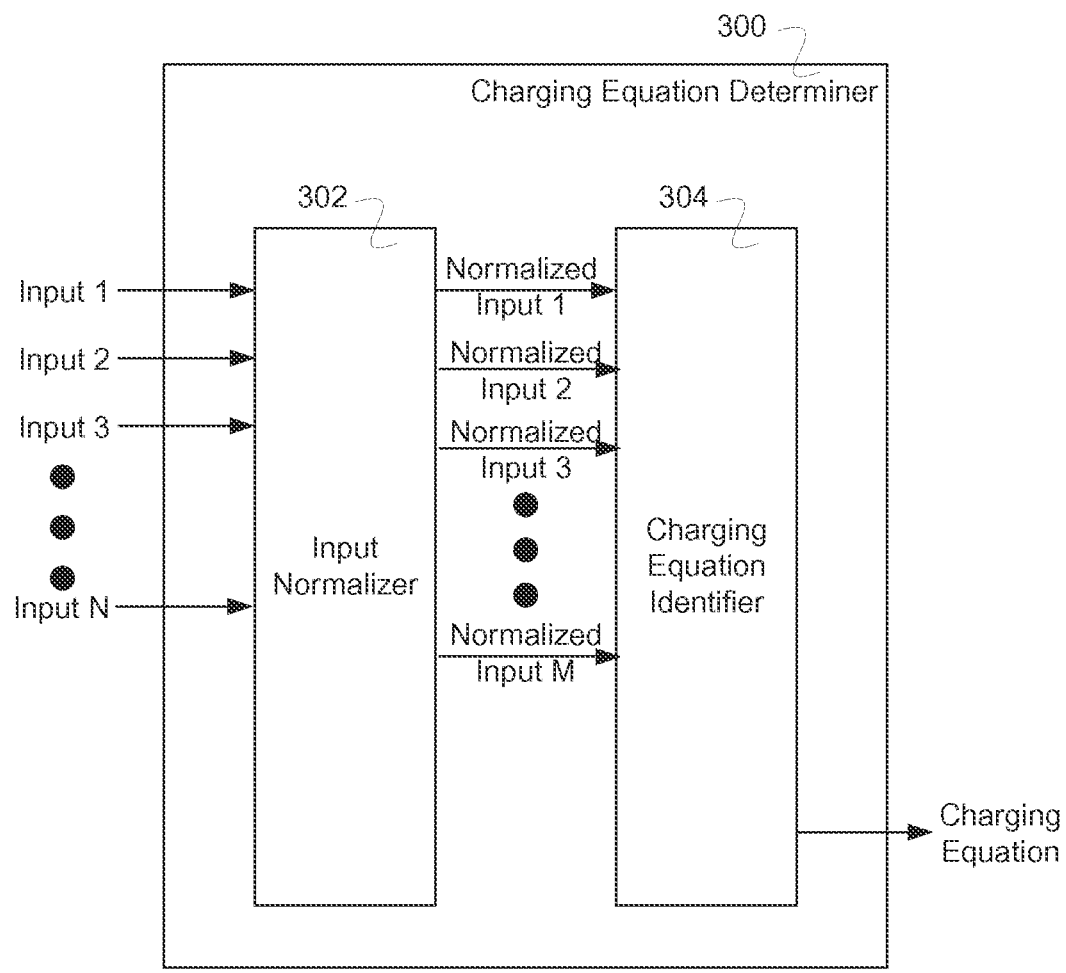
FIG. 3 is a block diagram illustrating an embodiment of a charging equation determiner.

FIG. 3 is a block diagram illustrating an embodiment of a charging equation determiner. In some embodiments, charging equation determiner 300 is used to implement charging equation determiner 208 of FIG. 2. In the example shown, charging equation determiner 300 comprises input normalizer 302 and charging equation identifier 304. Input normalizer 302 receives N inputs and produces M normalized inputs. In various embodiments, the N inputs comprise system status inputs, user information inputs, stored data inputs, or any other appropriate inputs. The N inputs are of arbitrary types and values, including integers, fractional numbers, strings, dates, phone numbers, IP addresses, GPS location codes, or any other reasonable type and value. The normalizer reduces this arbitrarily large value space into a much smaller normalized space, where each possible value for a normalized input is based on the values required by any given rate plan. For example, a time normalizer for one rate plan may take all the seconds in a week and normalize them into one of two values—peak or off-peak (or a numeric representation of these values). Another time normalizer, for a more complex rate plan, may take all the seconds in a week and normalize them into one of four values—peak, off-peak, lunch hour or weekend (or a numeric representation of these values). A balance normalizer that is used to trigger a discount once 100 Mb has been downloaded may normalize the value of the balance tracking downloaded quantity from any possible value into one of two values—"below 100 Mb" and "at/above 100 Mb" (or a numeric representation of these values). In various embodiments, N (e.g., the number of inputs) is greater than M (e.g., the number of normalized inputs), N is less than M, or N is equal to M. In various embodiments, each normalized input takes on an integer value from 1 to a predetermined maximum value, each normalized input is a specified string, or any other unique representation of the possible normalized input values. In some embodiments, the possible values for the M different normalized inputs are different from one another. In some embodiments, the values determined for the M normalized inputs are determined entirely from the N inputs (e.g., there are no other inputs or stored internal states that are used to determine the M normalized inputs). For any given charging parameter that has an effect on the charging equation (e.g., daytime/nighttime, user's rate plan, basic plan minutes/overtime minutes, byte transfer rate cost, etc.) there is an associated normalized input that represents the current state of the charging parameter. In some embodiments, the M normalized inputs are used to locate or look up the charging equation indicated by the N inputs. In some embodiments, a change in one or more of the N inputs will not result in a change in any of the M normalized inputs unless it requires a change in the charging equation. Charging equation identifier 304 locates and outputs a charging equation based on the M normalized inputs. In some embodiments, charging equation identifier 304 locates a charging equation from a predetermined set of charging equations. In some embodiments, charging equation identifier 304 identifies the charging equation by using the M normalized inputs as indices into an M dimensional matrix of charging equations. In some embodiments, more than one charging equation is used (e.g., multiple balances are modified during the connection), and charging equation identifier 304 identifies and outputs the necessary number of charging equations. In some embodiments, multiple charging equations are stored together in charging equation identifier 304 and are identified together using a single lookup. In some embodiments, multiple copies of charging equation identifier 304 are created and multiple charging equations are identified separately from the separate charging equation identifiers.

In some embodiments, charging equation determiner 300 of FIG. 3 is used as a general decision determiner for policy management decision-making processes outside the area of charging systems. The set of N inputs to input normalizer 302 can be any appropriate inputs for the decision-making process. The set of M normalized inputs represent the decision indicated by the N inputs, and a change in one or more of the N inputs will not result in a change in any of the M normalized inputs unless it requires a change in the decision output. When charging equation determiner 300 is used as a decision calculator, charging equation identifier 304 is a decision identifier that identifies and outputs a decision based on the M normalized inputs. In some embodiments, the decision identifier identifies the decision by using the M normalized inputs as indices into an M dimensional matrix of decisions.

Figure 4:
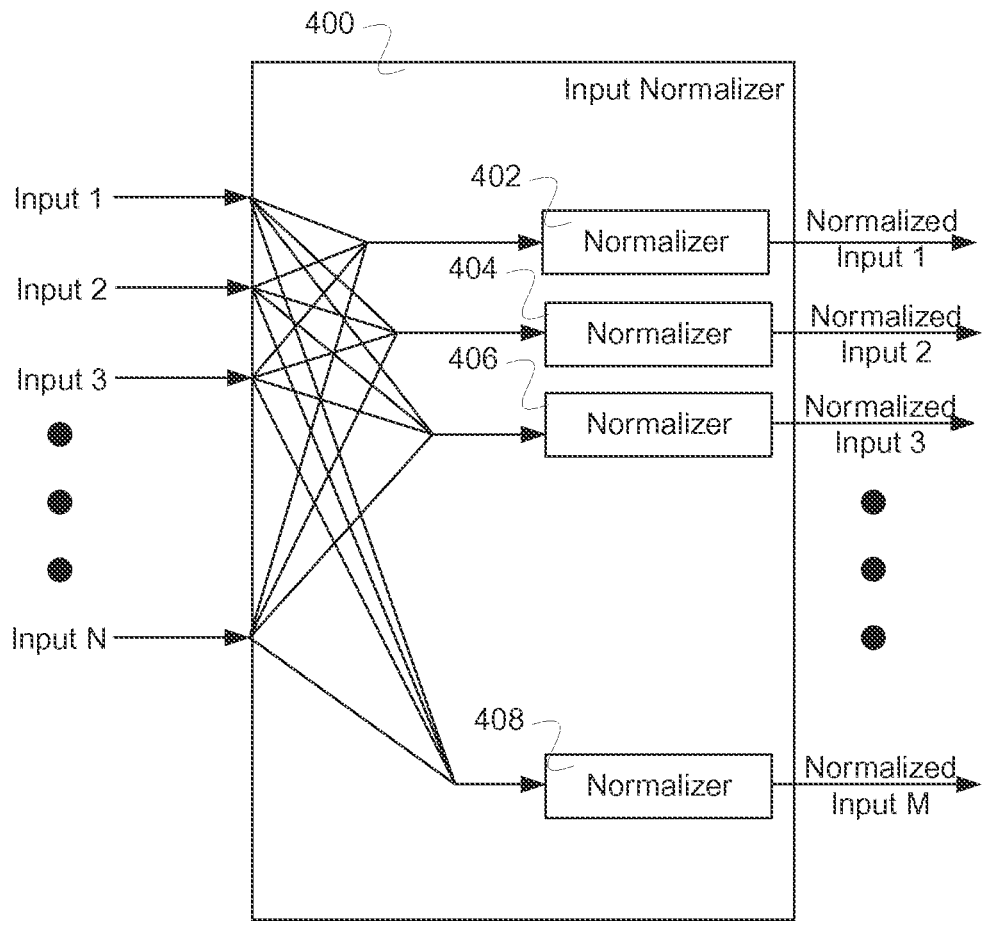
FIG. 4 is a block diagram illustrating an embodiment of an input normalizer.

FIG. 4 is a block diagram illustrating an embodiment of an input normalizer. In some embodiments, input normalizer 400 is used to implement input normalizer 302 of FIG. 3. In the example shown, input normalizer 400 receives N inputs and produces M normalized inputs. In various embodiments, N (e.g., the number of inputs) is greater than M (e.g., the number of normalized inputs), N is less than M, or N is equal to M. Input normalizer 400 comprises normalizer 402, normalizer 404, normalizer 406, normalizer 408, and any other appropriate number of normalizers, for a total of M normalizers. In various embodiments, there are 1, 2, 4, 10, 22, or any other appropriate number of normalizers. Each normalizer receives and processes a subset of the N inputs to produce one normalized input. In various embodiments, each normalizer receives one of the N inputs, each normalizer receives all of the N inputs, some normalizers receive different subsets of the N inputs from one another, or each normalizer receives any appropriate subset of the N inputs. Each normalizer calculates a normalized input from the inputs it receives using various analysis techniques including but not limited to one or more of the following: integer matching, balance range matching, date range matching, time range matching, string matching, string best match, date matching, zone matching, calling group matching, or any other appropriate data normalization technique. In some embodiments, a generic set of data normalizers (e.g., a date matching normalizer, a string matching normalizer, an integer matching normalizer, etc.) are programmed and are later configured to apply to the specific charging situation (e.g., a normalizer to give a different charging rate on the user's birthday, a normalizer to give a different charging rate when the user is calling specific phone numbers or area codes, etc.). For example, there are three charging rates for calls in a day: daytime (e.g., 200/minute), evening (e.g., 100/minute), and nighttime (e.g., 50/minute); the input to a charging equation determiner is a moment in time. The normalizer takes as input the time of day (and possibly day of week, etc.) and produces as output one of the set of [daytime, evening, or nighttime]. The charging equation identifier has as input one of the set of [daytime, evening, or nighttime] and produces as output a charging equation—for example the charging equation includes the rate (e.g., one of the set of [200, 100, or 50] per minute). In some embodiments, each of the M normalizers is marked as static or dynamic. A normalizer marked as static has only static inputs, and thus its output can never change over the course of the connection. A normalizer marked as dynamic has at least one dynamic input, and thus its output can change over the course of the connection. In some embodiments, normalizers marked as static do not perform a calculation during a reauthorization process and instead output a value stored from a previous calculation. Once inputs have been received by input normalizer 400, each normalizer operates independently to produce its normalized input. In some embodiments, the normalizers run in parallel in order to reduce latency from the receipt of the inputs to output of the normalized inputs.

Figure 5:
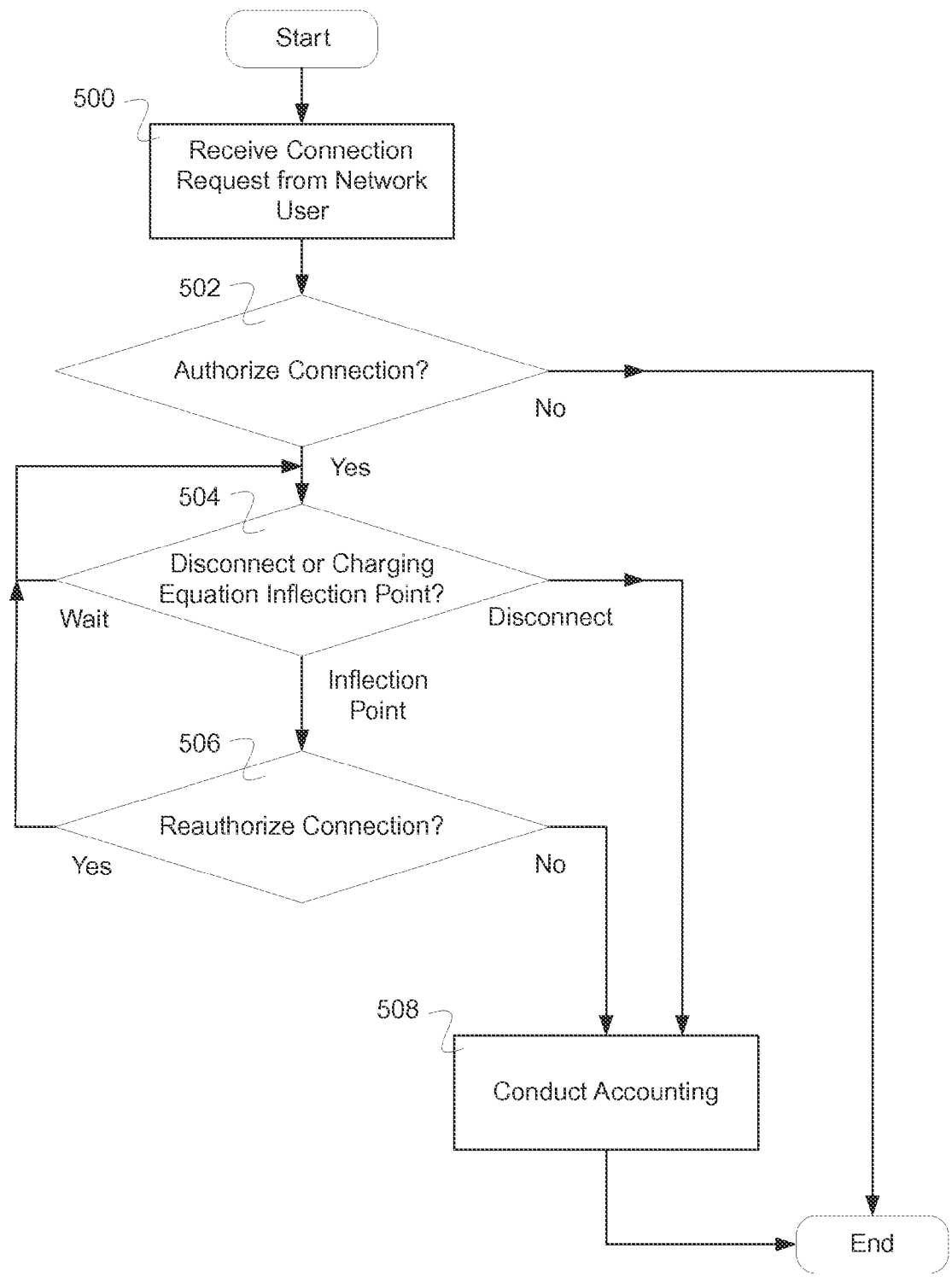
FIG. 5 is a flow diagram illustrating an embodiment of a process for managing and accounting for a connection on a network.

FIG. 5 is a flow diagram illustrating an embodiment of a process for managing and accounting for a connection or communication on a network. In some embodiments, the process of FIG. 5 is executed by a charging server (e.g., charging server 104 of FIG. 1). In some embodiments, the process of FIG. 5 is used to manage and account for a network user (e.g., network user 100 of FIG. 1) making a connection on a network (e.g., network 102 of FIG. 1). In the example shown, in 500, a connection request is received from a network user. In various embodiments, the connection request is initiated by the network user, the connection request is in response to a request from a different network user, the connection request is part of an automated process, or the connection request is made for any other appropriate reason. In 502, it is determined whether the connection is authorized. Authorizing the connection comprises determining whether the network user (e.g., the network user making a connection request in 500) is allowed to make a connection to the network. In some embodiments, if the network user is allowed to make a connection to the network, authorizing the connection additionally comprises determining the current charging equation and/or determining the next charging equation inflection point. In the event that the connection is not authorized (e.g., the connection authorization process returns "Not Ok"), the process ends. In the event that the connection is authorized (e.g., the connection authorization process returns "Ok"), control passes to 504.

In 504, it is determined whether there is a disconnect or a charging equation inflection point. A disconnect can be received at any time. In various embodiments, a disconnect is received from a network user, a disconnect is received in response to a request from a different network user, a disconnect is received as a result of an automated process, or a disconnect is received for any other appropriate reason. In various embodiments, a charging equation inflection point occurs at a predetermined time, a charging equation inflection point occurs at a time predetermined to be when external conditions cause the charging equation to change, a charging equation inflection point occurs at a maximum time from the last connection authorization or reauthorization, a charging equation inflection point occurs when a balance hits a value (e.g., number of minutes hits a minute value, a number of bytes transferred hits a byte number value, etc.) is within a range of values or is greater than or less than a value, a charging equation inflection point occurs when a rate of change of a balance is a value or is within a range of values or is greater than or less than a value, or any other appropriate time for a charging equation inflection point. In some embodiments, while the process is waiting for a disconnect or a charging equation inflection point, the user is charged for the connection according to the current charging equation. In some embodiments, the charges for the connection are computed by a charging determiner (e.g., charging determiner 210 of FIG. 2). In the event that a charging equation inflection point is reached, control passes to 506. In the event that a disconnect is received, control passes to 508. In some embodiments, when the process begins waiting for a disconnect or a charging equation inflection point, charges for the connection (e.g., charges for a call time, a number of bytes transferred, etc.) until the next charging equation inflection point are reserved from the user's account balance(s). In the event that neither a disconnect is received nor a charging equation inflection point is reached, then the system waits and control stays with 504. In some embodiments, the system can accurately predict when an inflection point will be reached and the charging equation that will become valid after the next inflection point. Under these circumstances, the system may authorize multiple segments of the connection in a single response, without having to recalculate at the next inflection point.

In 506, it is determined whether the connection is to be reauthorized. Reauthorizing the connection comprises determining whether the network user (e.g., the network user making a connection request in 500) is still allowed to maintain a connection to the network. In some embodiments, if the network user is still allowed to maintain a connection to the network, reauthorizing the connection additionally comprises determining a new charging equation and/or determining the next charging equation inflection point. The new charging equation may be the same or different than the previous charging equation. In the event that the user is determined to not be allowed to connect (e.g., the connection authorization process returns "Not Ok" or "No"), control passes to 508. In the event that the user is determined to be allowed to connect (e.g., the connection authorization process returns "Ok" or "Yes"), the control passes to 504. In 508, accounting is conducted. For example, conducting accounting comprises determining the total charge to the network user and modifying account balances accordingly.

As an example, let's say a user is connecting to a network to watch a streaming video. In this example, the user's rate plan specifies that video data costs $0.20/Mb during peak hours (9:00 am-5:00 pm) and $0.10/Mb during off-peak hours (5:00 pm-9:00 am). In addition, this user has pre-purchased 50 Mb of data transfer that can be applied at any time. When the user connects and requests the video streaming, in 500 an authorization request is received from the network. In 502, it is calculated that an initial authorization of 50 Mb can be approved because of the pre-purchased data for the user. This pre-purchased data is valid at any time, so the authorization to the network is specified only with the limit that reauthorization must be requested once 50 Mb has been streamed. When this inflection is reached, the network requests reauthorization in 504. Let's say this reauthorization request is received at 8:15 am and at that time the user has $20 of available credit in their account. In 504, it is calculated that the user's credit allows an additional 200 Mb to be authorized, but this calculation is only valid until 9:00 am when the charging rate changes. In 506, the continuation of the streaming video is authorized, but with two limits—the streaming of an additional 200 Mb or reaching the time of 9:00 am, whichever comes first. Let's say at 9:00 am the user has streamed an additional 100 Mb of data. The network again requests a reauthorization, and notifies in 504 that as of 9:00 am an additional 100 Mb were consumed. In 506, it is calculated that the cost of this 100 Mb is $10, so the remaining credit available for the user is now $10. Given this credit, the user can stream an additional 50 Mb of data at the peak rate, so in 506 again the reauthorization is approved, but with limits of 50 Mb consumed or 5:00 pm, whichever comes first. Let's say the video finishes streaming after 20 Mb of this last reauthorization are consumed. The network notifies in 504 that the communication has completed (a disconnect). In 508, it is calculated that the total cost for the entire communication equals the 50 Mb of pre-purchased data plus $12, and the user's balances are charged accordingly.

Figure 6:
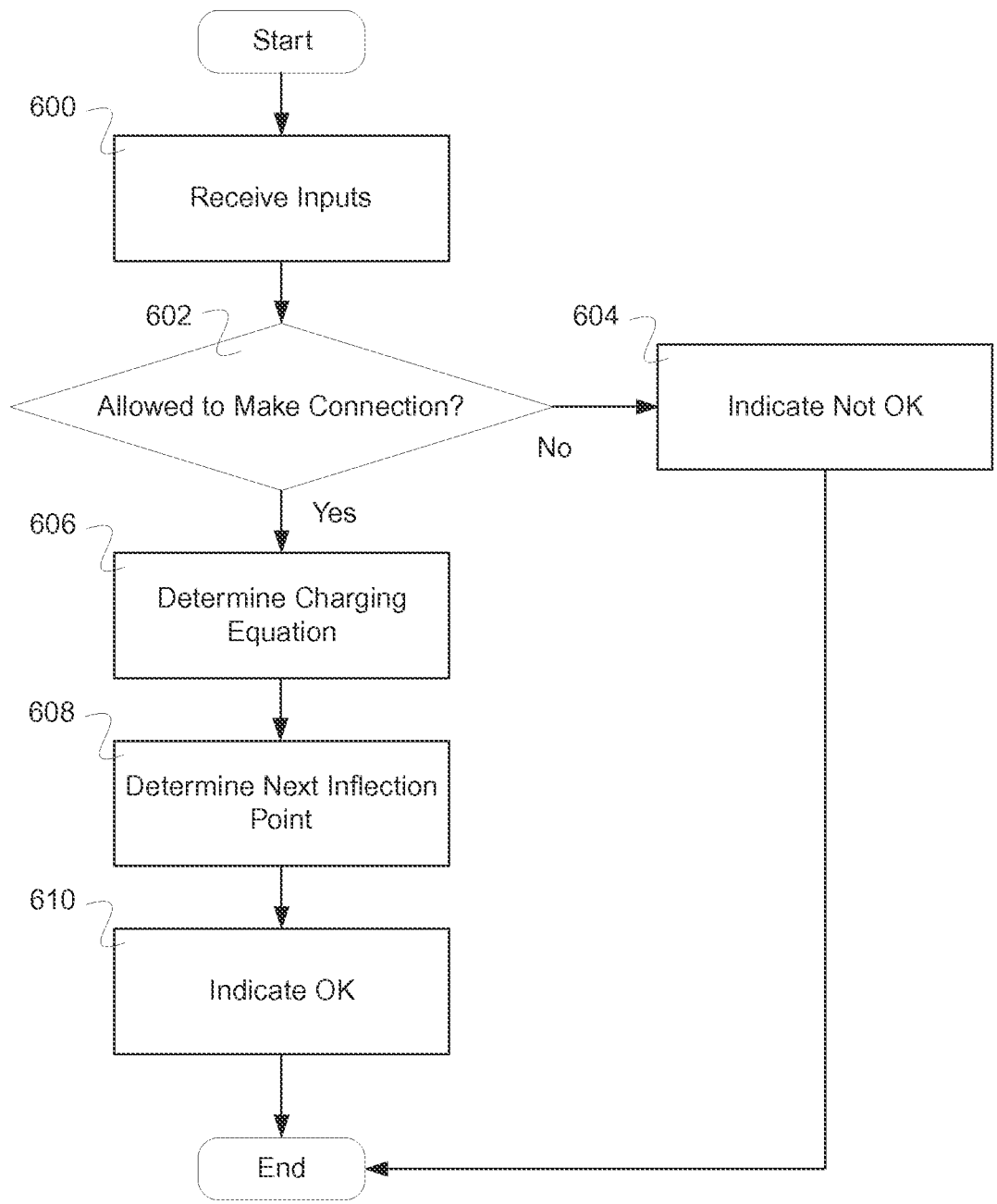
FIG. 6 is a flow diagram illustrating a process for making a connection.

FIG. 6 is a flow diagram illustrating a process for making a connection. In some embodiments, the process of FIG. 6 is used to implement 502 or 506 of FIG. 5. In the example shown, in 600, inputs are received. In various embodiments, inputs comprise system status inputs, charging structure data inputs, user data inputs, or any other appropriate inputs. In some embodiments, charging structure data inputs are received and stored during system initialization, and are not received during an authorization or reauthorization process. In some embodiments, during a reauthorization process (e.g., 506 of FIG. 5) only inputs marked as dynamic inputs are received. In 602, it is determined whether a connection is allowed to be made. In various embodiments, determining whether the user is allowed to make a connection comprises one or more of the following: checking the user's charging plan, checking the user's remaining duration of connection time, checking the user's account balance(s), checking the current date and/or time, or using any other appropriate decision-making process. In the event that the user is determined to not be allowed to connect, control passes to 604. In 604, the process indicates "Not Ok," and the process ends. In the event that the user is determined to be allowed to connect, control passes to 606.

In 606, a charging equation is determined. Optimized operations for a charging system architecture are used to determine the charging equation. In some embodiments, a charging equation determiner (e.g., charging equation determiner 300 of FIG. 3) is used to determine the charging equation. Inputs received in 600 are used to determine the charging equation. In some embodiments, when determining a charging equation during a reauthorization process, only calculations based at least partly on dynamic inputs are recalculated, and stored values of calculations based only on static inputs are used. In 608, the next inflection point is determined. For example, a time or condition to the next inflection point. In some embodiments, determining the time to the next inflection point comprises determining the next time that the charging equation will change under the conditions of charging according to the current charging equation. In some embodiments, if the time to the next inflection point is determined to be greater than a predetermined threshold value, the predetermined threshold value is used as the time to the next inflection point. In various embodiments, a number of minutes to a next inflection point is determined or any other appropriate quantity other than time is used to determine the next inflection point. In some embodiments, an inflection point occurs when a number of bytes has transferred. In 610, the process returns "Ok" and ends.

Figure 7:
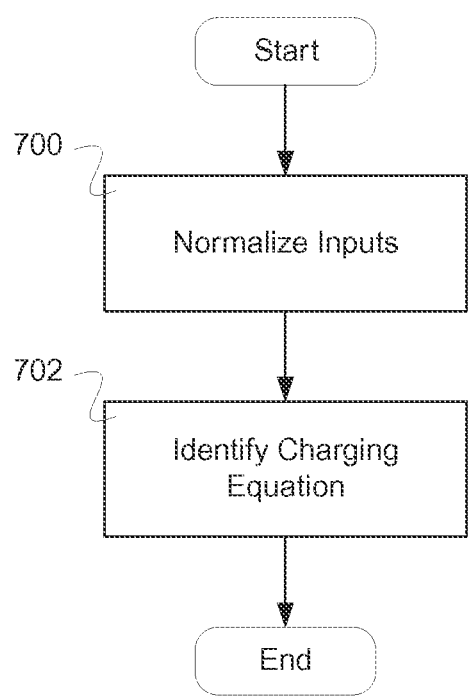
FIG. 7 is a flow diagram illustrating an embodiment of a process for determining a charging equation.

FIG. 7 is a flow diagram illustrating an embodiment of a process for determining a charging equation. In some embodiments, the process of FIG. 7 is used to implement 606 of FIG. 6. In the example shown, in 700, inputs are normalized. In some embodiments, inputs are normalized by an input normalizer (e.g., input normalizer 400 of FIG. 4). Normalizing inputs comprises creating a set of normalized inputs from a received set of inputs (e.g., inputs received in 500 of FIG. 5). In 702, a charging equation is located. In some embodiments, a charging equation is located by a charging equation identifier (e.g., charging equation identifier 304 of FIG. 3). Identifying a charging equation comprises identifying a charging equation based on the set of normalized inputs. In some embodiments, identifying a charging equation comprises identifying a charging equation by using the set of normalized inputs as indices into a matrix of charging equations.

In some embodiments, the process of FIG. 7 is used as a general decision calculation process for policy management decision-making processes outside the area of charging systems. The inputs normalized in 700 can be any appropriate inputs for the decision-making process. When the process of FIG. 7 is used as a decision calculation process, a decision is identified in 702 based on the normalized inputs created in 700. In some embodiments, the decision is identified by using the normalized inputs as indices into a matrix of decisions.

Figure 8:
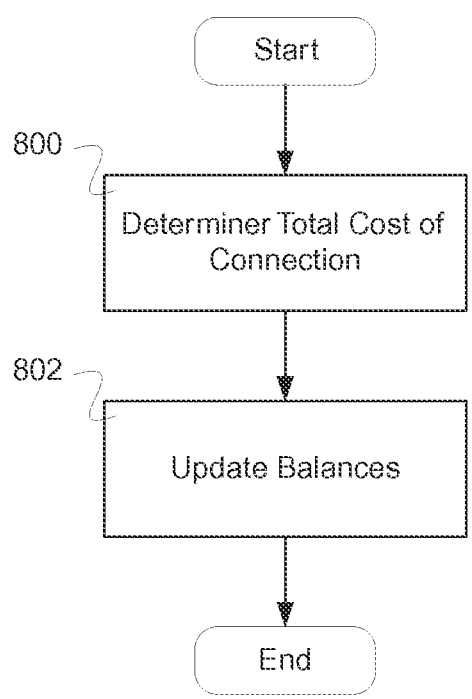
FIG. 8 is a flow diagram illustrating an embodiment of a process for conducting accounting.

FIG. 8 is a flow diagram illustrating an embodiment of a process for conducting accounting. In some embodiments, the process of FIG. 8 is used to implement 508 of FIG. 5. In the example shown, in 800, the total cost of the connection is determined. In some embodiments, the total cost of the connection is determined by summing the charges accrued over the course of the call (e.g., the charges accrued while waiting in 504 of FIG. 5). In some embodiments, the total cost of the connection is determined by a charging computer (e.g., charging computer 210 of FIG. 2). In 802, balances are updated. Balances are updated to reflect the total cost of the connection determined in 800. In some embodiments, updating balances comprises modifying a user data (e.g., data in user database 206 of FIG. 2).

Figure 9:
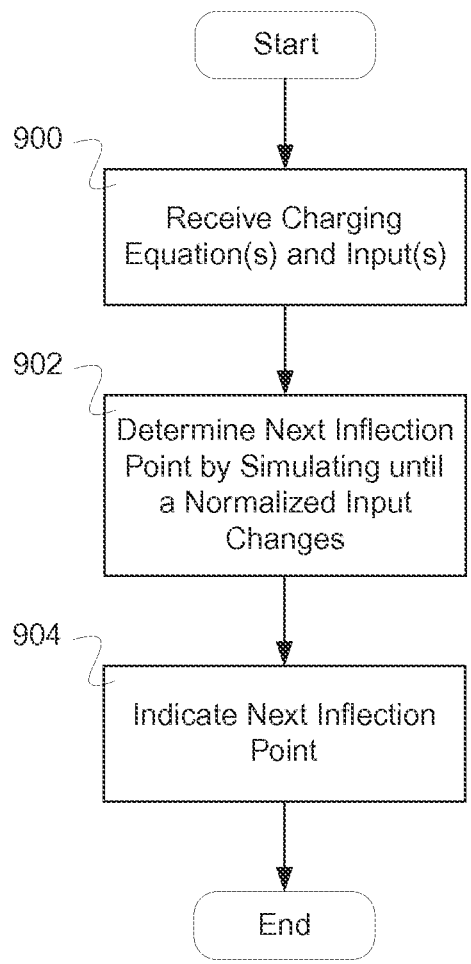
FIG. 9 is a flow diagram illustrating an embodiment of a process for determining the next inflection point.

FIG. 9 is a flow diagram illustrating an embodiment of a process for determining the next inflection point. In some embodiments, the process of FIG. 9 is used to implement 608 of FIG. 6. In the example shown, in 900, a charging equation(s) and input(s) are received. In some embodiments, the charging equation or equations were determined by a charging equation determiner (e.g., charging equation determiner 300 of FIG. 3). In some embodiments, the inputs were received at the beginning of an authorization or reauthorization process (e.g., process of FIG. 6 for making a connection). In 902, a next inflection point is determined by simulating until a normalized input changes. For example, for a given set of current values (e.g., a minute balance, a byte balance, etc.), it is determined what inflection point (e.g., a boundary) is hit next for each value. In some embodiments, there are more than one inflection point that can be a next inflection point depending on the values and how they progress or change. In some embodiments, the next inflection point is predicted to come up in a certain amount of time. In some embodiments, the next inflection point is predicted to come up in a certain number of bytes transferred. In various embodiments, the normalized inputs change as a function of time, dollars in an account balance, remaining minute balance, call minutes, bytes, or any other appropriate parameter.

For example, time passing is simulated until the normalized input(s) change. Time passing is simulated by calculating new values for the inputs as they would change over time. For instance, the time input is updated; account balance inputs are updated according to the charging equation or equations; connection duration counter inputs are updated, etc. As the inputs are updated, the normalized inputs are recalculated, e.g., using input normalizer 400 of FIG. 4. Simulation of time passing continues until the calculation of the normalized inputs changes compared with the value calculated from the inputs received in 900. The time when the calculation of the normalized inputs changes is determined to be the time to the next inflection point. In some embodiments, the next inflection point is determined by simulating the number of bytes transferred.

In 904, a next inflection point is indicated. For example, the time or the number of bytes transferred or a condition to the next inflection point is reported. In various embodiments, the time or bytes or other condition is reported back to the authorization or reauthorization process, or any other appropriate information is reported back. In some embodiments, in 902, time passing is simulated until the time passes a predetermined duration (e.g., no more than 10 minutes of simulated time are calculated). The time at the end of this duration is then reported in 904 as the time to the next inflection point even if there is no change in the normalized inputs at that point. In some embodiments, a number of bytes are simulated as being transferred until the number of bytes passes a predetermined quantity (e.g., no more than 10 Mbytes). The number of bytes at the end of this transfer is then reported as the condition for the next inflection point even if there is no change in the normalized inputs at that point.

FIG. 10 is a table illustrating an embodiment of a charge determination. In the example shown, balances are a United States (US) dollar balance and include a peak minutes used balance, and an off-peak minutes used balance. The table example describes a phone call that begins at 4:40 PM and lasts for 45 minutes. At the state of call, the US dollar balance is 85, the peak minutes used for current month is 90, and the off-peak minutes used balance used for current month is 80. The table has a top row that has time values; the values are 4:40, 4:45, 4:50, 4;55, 5:00, 5:05, 5:10, 5:15, 5:20, and 5:25. The table has a second row that has rate values; the values are $0.00, $0.50, $0.50, $0.20, $0.20, $0.35, $0.35, $0.35, $0.35, and $0.10. The table has a third row that has discount values; the values are 0%, −20%, −20%, −20%, −20%, −40%, −40%, −40%, −40%, and −40%. The table has a fourth row that has charge values; the values are $0.00, $2.50, $5.00, $6.00, $7.00, $8.75, $10.50, $12.25, $14.00, and $14.50. The table has a fifth row that has a discount of the charge value. The discount of the charge values are $0.00, −$0.50, −$1.00, −$1.20, −$1.40, −$2.10, −$2.80, −$3.50, −$4.20, and −$4.40. The table has a sixth row that has a net cost value; the values are $0.00, $2.00, $4.00, $4.80, $5.60, $6.65, $7.70, $8.75, $9.80, and $10.10. The table has a seventh row that has a peak minute balance value; the values are 90, 95, 100, 105, 110, 110, 110, 110, 110, and 110. The table has an eighth row that has an off-peak minute balance value; the values are 80, 80, 80, 80, 80, 85, 90, 95, 100, and 105. The table has a ninth row that has US dollar balance values. The values are $85, $87, $89, $89.80, $90.60, $91.65, $92.70, $93.75. $94.80, and $95.10.

Figure 11:
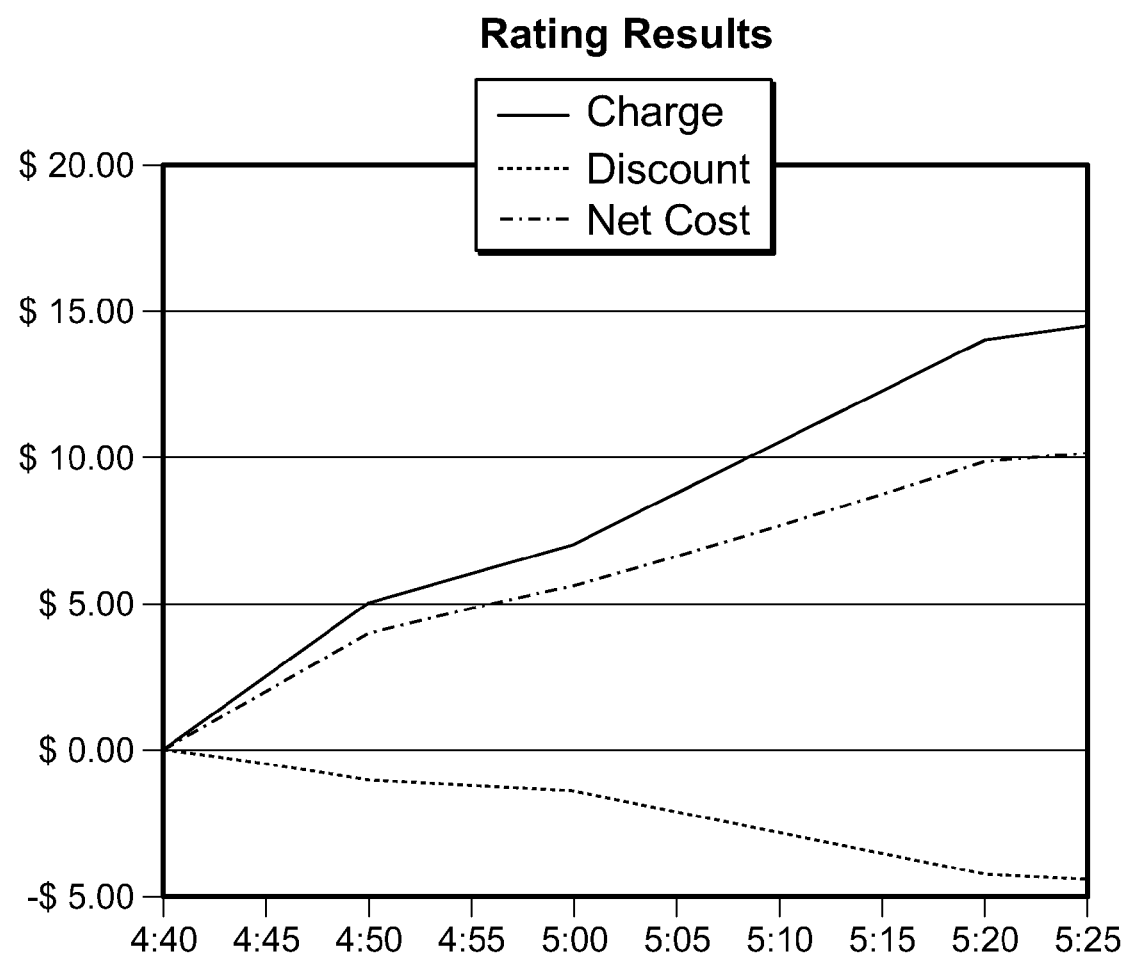
FIG. 11 is a graph illustrating an embodiment of a rating result.

FIG. 11 is a graph illustrating an embodiment of a rating result. In the example shown, the rating result graph is shown with a charge value trace (top trace), a discount of the charge value trace (bottom trace, negative values), and a net value trace (middle trace). The values shown are the values of table 10. The x-axis range shows time values 4:40 through 5:25. The y-axis range shows values −$5.00 to $20.00.

Figure 12:
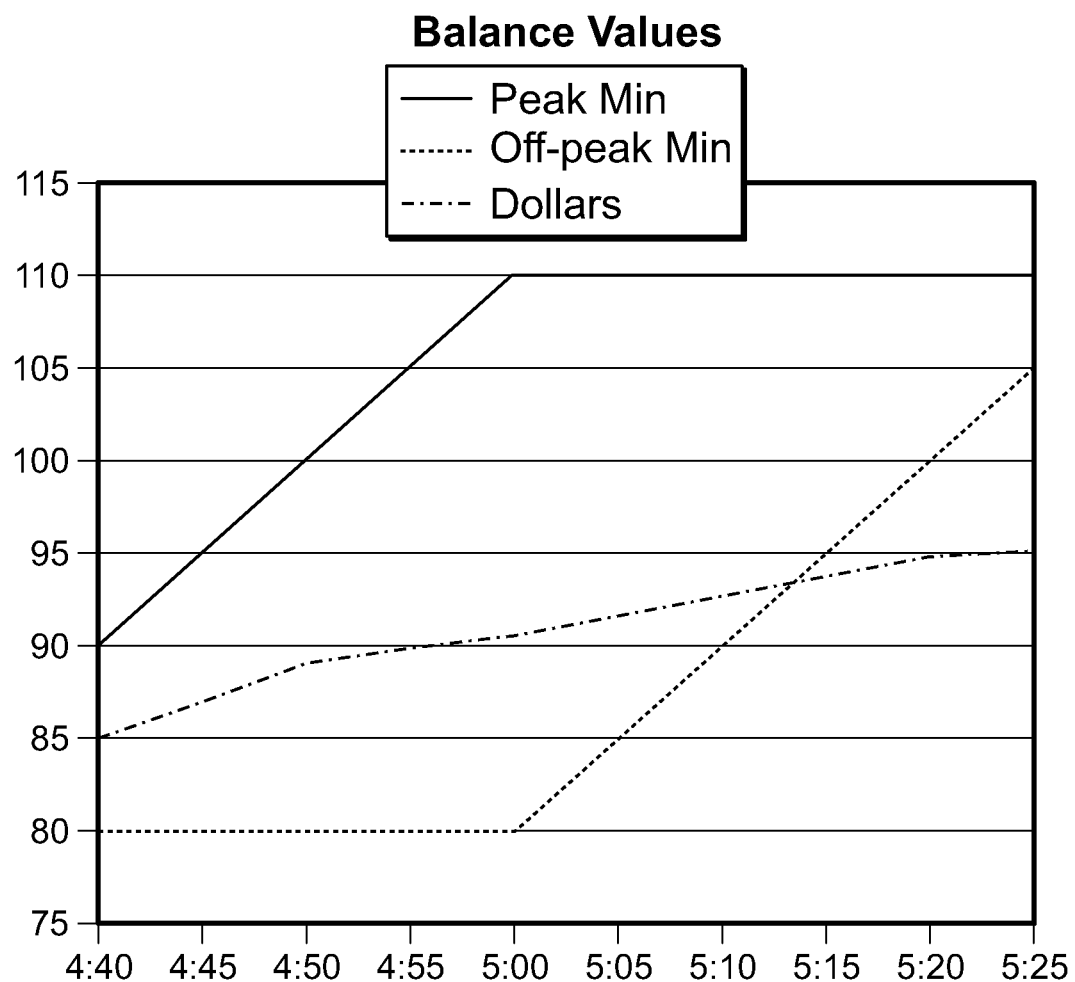
FIG. 12 is a graph illustrating an embodiment of balance values.

FIG. 12 is a graph illustrating an embodiment of balance values. In the example shown, the balance values graph is shown with a peak minute balance value (top trace), a dollar balance (middle trace on the left of the graph for time values 4:40 through 5:10, and bottom trace for time values 5:15 through 5:25), and an off-peak minute balance value (bottom trace on the left of the graph for time values 4:40 through 5:10, and middle trace for time values 5:15 through 5:25). The values shown are the values of table 10. The x-axis range shows time values 4:40 through 5:25. The y-axis range shows values 75 through 115.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for determining a communication charge, comprising:
   an input interface to:
      receive a dynamic input;
   a processor to:
      normalize the dynamic input;
      determine a charging equation based at least in part on a normalized set of inputs, wherein the dynamic input comprises a normalized input of the normalized set of inputs that is dynamic;
      determine an inflection point based at least in part on a charging structure database, wherein the inflection point is redetermined in the event that the dynamic input changes; and
      determine a communication charge based at least in part on the charging equation and the inflection point.

2. A system as in claim 1, wherein the normalized set of inputs are used as look-up indices for determining the charging equation.

3. A system as in claim 2, wherein the look-up indices look up the charging equation in one of the following: a matrix, a database, or a table.

4. A system as in claim 1, wherein the charging equation is determined using one or more linear equations that are determined based on the normalized set of inputs.

5. A system as in claim 4, wherein the one or more linear equations are determined based at least in part on one or more of the following: a user data, a charging structure data, or a status system data.

6. A system as in claim 1, wherein the inflection point determiner determines the inflection point by simulating a change in a parameter and determining at what value of the parameter the normalized set of inputs change.

7. A system as in claim 6, wherein the parameter comprises one or more of the following: time, dollars in an account balance, remaining minute balance, bytes, or call minutes.

8. A system as in claim 6, wherein in the event that a parameter value of the inflection point exceeds a predefined threshold value, the predefined threshold value is used as the inflection point.

9. A system as in claim 1, wherein the charging equation is used to determine authorization for a communication.

10. A system as in claim 1, wherein the charging equation is used to determine reauthorization for a communication.

11. A system as in claim 1, wherein the charging structure database indicates the inflection point defined by a rate change.

12. A system as in claim 1, wherein the charging structure database indicates the inflection point defined by a balance value.

13. A system as in claim 12, wherein the balance value comprises a time balance value.

14. A system as in claim 12, wherein the balance value comprises a byte balance value.

15. A system as in claim 1, wherein the charging structure database indicates the inflection point defined by a balance range.

16. A system as in claim 15, wherein the balance range has a minimum balance value.

17. A system as in claim 15, wherein the balance range has a maximum balance value.

18. A method for determining communication charging, comprising:
   receiving a dynamic input;
   normalizing the dynamic input;
   determining, using a processor, a charging equation based at least in part on a normalized set of inputs, wherein the dynamic input of the normalized input of the set of inputs that is dynamic;
   determining an inflection point based at least in part on a charging structure database, wherein the inflection point is redetermined in the event that the dynamic input changes; and
   determining a communication charge based at least in part on the charging equation and the inflection point.

19. A computer program product for determining communication charging, the computer program product being embodied in a non-transitory computer readable storage medium and comprising computer instructions for:
   receiving a dynamic input;
   normalizing the dynamic input;
   determining, using a processor, a charging equation based at least in part on a normalized set of inputs, wherein the dynamic input of the normalized input of the set of inputs that is dynamic;
   determining an inflection point based at least in part on a charging structure database, wherein the inflection point is redetermined in the event that the dynamic input changes; and
   determining a communication charge based at least in part on the charging equation and the inflection point.

* * * * *